(12) United States Patent
Gao et al.

(10) Patent No.: US 9,802,180 B2
(45) Date of Patent: Oct. 31, 2017

(54) CATALYST FOR SYNERGISTIC CONTROL OF OXYNITRIDE AND MERCURY AND METHOD FOR PREPARING THE SAME

(71) Applicant: ZHEJIANG UNIVERSITY, Hangzhou, Zhejiang Province (CN)

(72) Inventors: Xiang Gao, Hangzhou (CN); Kunzan Qiu, Hangzhou (CN); Chenghang Zheng, Hangzhou (CN); Hao Song, Hangzhou (CN); Weihong Wu, Shaoxing (CN); Xinbo Zhu, Hangzhou (CN); Hongmin Yu, Hangzhou (CN); Dian Xu, Hangzhou (CN); Zhongyang Luo, Hangzhou (CN); Kefa Cen, Hangzhou (CN); Mingjiang Ni, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 15/104,045

(22) PCT Filed: Dec. 11, 2013

(86) PCT No.: PCT/CN2013/089075
§ 371 (c)(1),
(2) Date: Jun. 13, 2016

(87) PCT Pub. No.: WO2015/085513
PCT Pub. Date: Jun. 18, 2015

(65) Prior Publication Data
US 2016/0354766 A1    Dec. 8, 2016

(51) Int. Cl.
| | | |
|---|---|---|
| *B01J 23/888* | (2006.01) | |
| *B01J 23/30* | (2006.01) | |
| *B01D 53/86* | (2006.01) | |
| *B01J 23/00* | (2006.01) | |
| *B01J 37/02* | (2006.01) | |
| *B01J 37/04* | (2006.01) | |

(52) U.S. Cl.
CPC ........ *B01J 23/888* (2013.01); *B01D 53/8628* (2013.01); *B01D 53/8665* (2013.01); *B01J 23/002* (2013.01); *B01J 23/30* (2013.01); *B01J 37/0213* (2013.01); *B01J 37/04* (2013.01); *B01D 2255/207* (2013.01); *B01D 2255/20707* (2013.01); *B01D 2255/20723* (2013.01); *B01D 2255/20738* (2013.01); *B01D 2255/20761* (2013.01); *B01D 2255/20769* (2013.01); *B01D 2255/20776* (2013.01); *B01D 2255/20784* (2013.01); *B01D 2257/602* (2013.01); *B01D 2258/0283* (2013.01); *B01J 2523/00* (2013.01)

(58) Field of Classification Search
CPC . B01J 21/063; B01J 23/22; B01J 23/26; B01J 23/28; B01J 23/30; B01J 23/8472; B01J 23/8474; B01J 23/862; B01J 23/868; B01J 23/881; B01J 23/885; B01J 23/888; B01J 37/0213; B01J 37/04; B01D 2255/20707; B01D 2255/20723; B01D 2255/20738; B01D 2255/20746; B01D 2255/20761; B01D 2255/20769; B01D 2255/20776; B01D 2255/20784; B01D 2257/402; B01D 2257/404; B01D 2257/602
USPC ....... 502/305, 309, 311, 312, 318, 319, 321, 502/350; 423/99, 701, 239.1
See application file for complete search history.

(56) References Cited

U.S. PATENT DOCUMENTS

| | | | | |
|---|---|---|---|---|
| 3,894,971 | A * | 7/1975 | Reuter | B01J 23/22 502/178 |
| 4,052,418 | A * | 10/1977 | Suresh | C07C 51/215 502/202 |
| 4,233,139 | A * | 11/1980 | Murrell | B01J 23/20 208/112 |
| 4,582,911 | A * | 4/1986 | Wachs | B01J 23/20 502/350 |
| 6,099,819 | A * | 8/2000 | Srinivas | B01D 53/8612 423/242.1 |
| 7,744,849 | B2 * | 6/2010 | Hagemeyer | B01J 23/58 423/644 |

(Continued)

FOREIGN PATENT DOCUMENTS

| | | | | | |
|---|---|---|---|---|---|
| CN | 10-1528343 | * | 9/2009 | ............. | B01J 23/28 |
| CN | 101528343 | A | 9/2009 | | |
| CN | 10-1972647 | * | 2/2011 | ............. | B01D 53/56 |
| CN | 10-1972652 | * | 2/2011 | ............. | B01D 53/56 |
| CN | 101972652 | A | 2/2011 | | |
| CN | 10-2294248 | * | 12/2011 | ............. | B01D 53/86 |

(Continued)

*Primary Examiner* — Patricia L Hailey
(74) *Attorney, Agent, or Firm* — Jiwen Chen

(57) ABSTRACT

Disclosed are a catalyst for synergistic control of oxynitride and mercury and a method for preparing the same. The catalyst includes the following components by mass percentage: a carrier: TiO2 72%-98.6%, active components: V2O5 0.1%-5%, WO3 1%-10%, Cr2O3 0.1%-5% and Nb2O5 0.1%-5%, and a co-catalyst of 0.1%-3%. The present invention can be used for reducing the oxynitrides in a flue gas, meanwhile oxidizing zero-valent mercury into bivalent mercury and then controlling the reactions, has relatively high denitration performance and also has high mercury oxidation performance; compared with current commercial SCR catalysts, the mercury oxidation rate of the catalyst is improved to a great extent, which can adapt to the requirements for mercury removal in China's coal-fired power plants, the conversion rate of SO2/SO3 is relatively low, and the catalyst has a better anti-poisoning ability, and is a new catalyst with a low cost and high performance.

5 Claims, No Drawings

(56) References Cited

U.S. PATENT DOCUMENTS

| | | | | |
|---|---|---|---|---|
| 8,288,309 B2 | * | 10/2012 | Nochi | B01D 53/8665 |
| | | | | 423/107 |
| RE44,124 E | * | 4/2013 | Lovell | B01D 53/02 |
| | | | | 502/216 |
| 8,410,013 B2 | * | 4/2013 | Nochi | B01D 53/8628 |
| | | | | 423/107 |
| 2007/0149391 A1 | * | 6/2007 | Yeung | B01D 53/8634 |
| | | | | 502/232 |
| 2011/0230668 A1 | * | 9/2011 | Altwasser | B01J 21/063 |
| | | | | 549/248 |
| 2011/0250114 A1 | * | 10/2011 | Augustine | B01D 53/8628 |
| | | | | 423/239.1 |

FOREIGN PATENT DOCUMENTS

| | | | | | |
|---|---|---|---|---|---|
| CN | 102294248 A | | 12/2011 | | |
| CN | 10-2335603 | * | 2/2012 | | B01D 53/58 |
| CN | 102335603 A | | 2/2012 | | |
| JP | 53-055492 | * | 5/1978 | | B01J 35/02 |
| JP | S5355492 A | | 5/1978 | | |

* cited by examiner

CATALYST FOR SYNERGISTIC CONTROL OF OXYNITRIDE AND MERCURY AND METHOD FOR PREPARING THE SAME

This is a U.S. national stage application of PCT Application No. PCT/CN2013/089075 under 35 U.S.C. 371, filed Dec. 11, 2013 in Chinese, which is hereby incorporated by reference.

FIELD OF THE INVENTION

The present invention relates to a catalyst production technology field, especially a catalyst for synergistic control of oxynitride and mercury and a method for preparing the same.

BACKGROUND OF THE INVENTION

Mercury, as a kind of toxic heavy metal, may injure nervous system, brain tissue and liver tissue after entering into the human body, and can accumulate in living creature and transfer around the world along with the food chain, thus having great harms. About one third of mercury discharged into the atmosphere comes from the mixed combustion process of coal or coal and wastes and the environmental protection pressure in China is tremendous because of the huge consumption of coal.

Considering that most power plants are now equipped with selective catalytic reduction (SCR) denitration devices and wet desulfurization systems, there is no need to add independent mercury removal equipment by oxidizing zero-valent mercury into bivalent mercury and then removing mercury in desulfurization system, which will help power plants to save pollutant control cost and have greater application prospect. However, low-chlorine coal is mainly used in power plants in China with lower HCl concentration in flue gas, while the current commercial SCR catalyst has a low mercury oxidation efficiency, which restricts the control of mercury in coal-fired power plants especially under the condition of low chlorine.

A Chinese patent CN102764655A discloses a new mercury removal catalyst which is prepared via pillared montmorillonite by mixing $TO_x$ (T refers to Cu, Fe, V) and $RO_y$ (R refers to La, Ce) with titanium dioxide. Such catalyst has high mercury removal efficiency, a certain anti-poisoning ability, no denitration capability and a complicated preparation process, and thus is not applicable for industrial application.

SUMMARY OF THE INVENTION

The present invention aims at solving such problems as low zero-valent mercury oxidation efficiency, narrow temperature window, poor anti-poisoning ability and other shortages of the current commercial SCR catalyst, and providing a catalyst for synergistic control of oxynitride and mercury to reduce the oxynitrides in a flue gas, meanwhile oxidize zero-valent mercury into bivalent mercury and then control the reactions, so as to have relatively high denitration performance and also has high mercury oxidation performance. Compared with prior art commercial SCR catalysts, the mercury oxidation rate of the catalyst of the present invention improved greatly, which can satisfy the requirements for mercury removal in China's coal-fired power plants, the conversion rate of $SO_2/SO_3$ is relatively low, and the catalyst has a better anti-poisoning ability, and is a new catalyst with a low cost and high performance.

The present invention also discloses a method for preparing the catalyst which is simple, practicable and applicable for industrial production.

Technical solution for solving problem in the present invention is as follows:

A catalyst for synergistic control of oxynitride and mercury and the catalyst comprisesthe following components by mass percentage: a carrier: $TiO_2$ 72-98.6%,
active components: $V_2O_5$ 0.1-5%, $WO_3$ 1-10%, $Cr_2O_3$ 0.1-5% and $Nb_2O_5$ 0.1-5%,
and a co-catalyst of 0.1-3%.

It is preferred that the co-catalyst is selected from CuO, $Fe_2O_3$ and $MoO_3$.

It is preferred that the $TiO_2$ is nanoscale anatase $TiO_2$ with particle size of less than 30 nm and the preferred particle size is less than 20 nm.

A method for preparing the catalyst for synergistic control of oxynitride and mercury, comprising the step of:

1) drying $TiO_2$ and using it as a carrier;
2) stirring ammonium metavanadate and ammonium metatungstate under 50° C.-70° C. to dissolve them in an oxalic acid or tartaric acid solution to obtain a solution A with pH value less than 2;

stirring chromic nitrate under 10-50° C. to dissolve in deionized water or tartaric acid to obtain a solution B;

stirring niobium oxalate under 50-70° C. to dissolve in deionized water or tartaric acid to obtain a solution C;

3) stirring cupric nitrate under 10-50° C. to dissolve in deionized water or tartaric acid to obtain a solution D;

or stirring ferric nitrate under 10-50° C. to dissolve in deionized water or tartaric acid to obtain a solution E;

or stirring ammonium molybdate under 10-50° C. to dissolve in deionized water or tartaric acid to obtain a solution F;

4) mixing the solution A, solution B and solution C with one of the solution D, solution E and solution F to obtain an impregnating solution, immersing the carrier from step 1) into the impregnating solution, stirring evenly for ultrasound concussion, evaporating and stirring with water bath for 10-60 minutes, drying in the oven and then calcining under 400° C.-550° C. for 3-5 h to obtain a catalyst for synergistic control of oxynitride and mercury.

Concentration of oxalic acid and tartaric acid in the present invention is preferred to be 1-10wt % and 1-20wt % respectively.

It is preferred that the drying in step 1) is drying under 105° C.-120° C. for 12 hours-24 hours.

It is preferred that the ultrasound concussion time in step 4) is 10-60 minutes.

It is preferred that the water bath temperature in step 4) is 70-90° C.

It is preferred that the drying condition in oven in step 4) is drying under 105-120° C. for 12-24 hours.

During research, the inventor unexpectedly found that the synergistic effect of $Cr_2O_3$ and $Nb_2O_5$ can accelerate mercury oxidation to a much greater extent and improve denitration activity with minor impact on $SO_2/SO_3$ conversion rate. The addition of CuO, FeO or $MoO_3$ can improve the stability and poison resistance and expand the reaction temperature window of the catalyst.

Based on long-term engagement in flue gas denitration, mercury removal and synergetic control of multiple pollutants, the inventor developed a catalyst for synergistic control of oxynitride and mercury so that the catalyst has higher denitration performance and higher mercury oxidation performance. Compared with current commercial SCR catalysts, the mercury oxidation rate of the catalyst is improved to a great extent, which can adapt to the requirements for mercury removal in China's coal-fired power plants, the conversion rate of $SO_2/SO_3$ is relatively low, and the catalyst has a better anti-poisoning ability, and is a new catalyst with a low cost and high performance.

Beneficial effects of the present invention include:

1) accelerated denitration performance and mercury oxidation performance of catalyst and save pollutant control cost; 2) relatively high oxidation rate of zero-valent mercury under low-chlorine condition; 3) good anti-poisoning performance of catalyst and strong adaptability to severe operating conditions; 4) simple preparation process with lower cost; and thus the catalyst can be extensively applied in flue gas denitration and mercury removal in coal-fired power plants.

DESCRIPTION OF THE PREFERRED EMBODIMENT

Technical solution to the present invention will be further described next with specific embodiments.

Unless otherwise particularly specified, raw materials and equipment used in the present invention can be purchased from the market or are commonly used in this field, and, unless otherwise particularly specified, methods in the following examples are conventional methods in this field.

EXAMPLE 1

1) $TiO_2$ (nanoscale anatase $TiO_2$, commercially available, particle size less than 30 nm) was dried under 105° C. for 12 hours and used as a carrier;

2) Ammonium metavanadate and ammonium metatungstate were stirred under 50° C. to dissolve in oxalic acid solution to obtain a solution A with pH value less than 2;
Chromic nitrate was stirred under 10° C. to dissolve in deionized water to obtain a solution B;
Niobium oxalate was stirred under 50° C. to dissolve in deionized water to obtain a solution C;

3) Cupric nitrate was stirred under 10° C. to dissolve in deionized water to obtain a solution D;

4) The solution A, solution B and solution C were mixed with the solution D to obtain an impregnating solution, the carrier from step 1) was immersed into the impregnating solution, stirred evenly for ultrasound concussion with ultrasonic cleaner for 10 minutes, evaporated and stirred with water bath under 70° C. for 10 minutes, dried in the oven under 105° C. for 12 hours and then calcine under 400° C. for 5 hours to obtain a catalyst for synergistic denitration and mercury oxidation with $V_2O_5$, $WO_3$, $Cr_2O_3$, $Nb_2O_5$ and CuO in the following mass percentage: carrier $TiO_2$ 98.6%, active component $V_2O_5$ 0.1%, active component $WO_3$ 1%, active component $Cr_2O_3$ 0.1%, active component $Nb_2O_5$ 0.1% and co-catalyst CuO 0.1%. The prepared catalyst was grounded and sieved to obtain catalyst particles with particle size of 40-60 mesh.

Test 1:

0.2 g catalyst particle prepared in example 1 was put into a catalyst denitration activity evaluation unit and activity evaluation was conducted in a fixed bed reactor with inner diameter of 8 mm. $O_2/N_2$, $NO/N_2$, $NH_3/N_2$, $SO_2/N_2$ and $N_2$ were controlled and mixed via mass flowmeter, deionized water was injected into heating pipeline for vaporization by adjusting volume in a micro-injection pump to realize addition of vapor and obtain simulated flue gas in such composition as 5% $O_2$, 1000 ppmNO, 1000 $NH_3$, 500 ppm$SO_2$ and 10% $H_2O$, with $N_2$ as balance gas, air speed of 300000 $h^{-1}$, reaction temperature of 350° C. and $NH_3/NO$ as 1. Test gas composition with ULTRMAT 32 gas analyzer manufactured by SIEMENS and the denitration efficiency was 72%.

0.2 g catalyst particle prepared in example 1 was put into a catalyst mercury removal activity evaluation unit and activity evaluation was conducted in a fixed bed reactor with inner diameter of 8 mm. $Hg^0/N_2$, $O_2/N_2$, $HCl\backslash N_2$, $NO/N_2$, $NH_3/N_2$, $SO_2/N_2$ and $N_2$ were controlled and mixed via mass flowmeter, deionized water was injected into heating pipeline for vaporization by adjusting volume in a micro-injection pump to realize addition of vapor and obtain simulated flue gas in such composition as 100 µg/m³$Hg^0$, 5% $O_2$, 10 ppmHCl, 300 ppmNO, 50 ppm$NH_3$, 500 ppm$SO_2$ and 10% $H_2O$, with $N_2$ as balance gas, air speed of 300000$h^{-1}$ and reaction temperature of 350° C. Mercury concentration was tested with EMP-2 portable mercury analyzer manufactured by NIC and the oxygenation rate of zero-valent mercury was 68%.

EXAMPLE 2

1) $TiO_2$ (nanoscale anatase $TiO_2$, commercially available, particle size less than 30 nm) was dried under 105° C. for 12 hours and used as a carrier;

2) Ammonium metavanadate and ammonium metatungstate were stirred under 50° C. to dissolve in tartaric acid solution to obtain a solution A with pH value less than 2;
Chromic nitrate was stirred under 10° C. to dissolve in deionized water to obtain a solution B;
Niobium oxalate was stirred under 50° C. to dissolve in deionized water to obtain a solution C;

3) Cupric nitrate was stirred under 30° C. to dissolve in tartaric acid to obtain a solution D;

4) the solution A, solution B and solution C were mixed with the solution D to obtain an impregnating solution, the carrier from step 1) was immersed into the impregnating solution, stirred evenly for ultrasound concussion with ultrasonic cleaner for 10 minutes, evaporated and stirred with water bath under 70° C. for 10 minutes, dried in the oven under 105° C. for 12 hours and then calcined under 400° C. for 5 hours to obtain a catalyst for synergistic denitration and mercury oxidation with $V_2O_5$, $WO_3$, $Cr_2O_3$, $Nb_2O_5$ and CuO in the following mass percentage: carrier $TiO_2$ 92.4%, active component $V_2O_5$ 0.1%, active component $WO_3$ 1%, active component $Cr_2O_3$ 2.5%, active component $Nb_2O_5$ 2.5% and co-catalyst CuO 1.5%. The prepared catalyst was grounded and sieved to obtain catalyst particles with particle size of 40-60 mesh.

Test 2:

0.2 g catalyst particle prepared in example 2 was put into a catalyst denitration activity evaluation unit and activity evaluation was conducted in a fixed bed reactor with inner diameter of 8 mm. $O_2/N_2$, $NO/N_2$, $NH_3/N_2$, $SO_2/N_2$ and $N_2$ were controlled and mixed via mass flowmeter, deionized water was injected into heating pipeline for vaporization by adjusting volume in a micro-injection pump to realize addition of vapor and obtain simulated flue gas in such composition as 5% $O_2$, 1000 ppmNO, 1000$NH_3$, 500 ppm$SO_2$ and 10%$H_2O$, with $N_2$ as balance gas, air speed of 300000 $h^{-1}$, reaction temperature of 350° C. and $NH_3/NO$ as 1. Gas composition was tested with ULTRMAT 32 gas analyzer manufactured by SIEMENS and the denitration efficiency was 75%.

0.2 g catalyst particle prepared in example 2 was put into a catalyst mercury removal activity evaluation unit and activity evaluation was conducted in a fixed bed reactor with inner diameter of 8 mm. $Hg^0/N_2$, $O_2/N_2$, $HCl\backslash N_2$, $NO/N_2$, $NH_3/N_2$, $SO_2/N_2$ and $N_2$ were controlled and mixed via mass flowmeter, deionized water was injected into heating pipeline for vaporization by adjusting volume in a micro-injection pump to realize addition of vapor and obtain simulated flue gas in such composition as 100 μg/m³Hg⁰, 5%$O_2$, 10 ppmHCl, 300 ppmNO, 50 ppmNH₃, 500 ppmSO₂ and 10%$H_2O$, with $N_2$ as balance gas, air speed of 300000 $h^{-1}$ and reaction temperature of 350° C. Mercury concentration was tested with EMP-2 portable mercury analyzer manufactured by NIC and the oxygenation rate of zero-valent mercury was 70%.

EXAMPLE 3

1) $TiO_2$ (nanoscale anatase $TiO_2$, commercially available, particle size less than 30 nm) was dried under 105° C. for 12 hours and used as a carrier;

2) Ammonium metavanadate and ammonium metatungstate was stirred under 50° C. to dissolve in oxalic acid solution to obtain a solution A with pH value less than 2;

Chromic nitrate was stirred under 10° C. to dissolve in deionized water to obtain a solution B;

Niobium oxalate was stirred under 50° C. to dissolve in deionized water to obtain a solution C;

3) Cupric nitrate was stirred under 50° C. to dissolve in deionized water to obtain a solution D;

4) The solution A, solution B and solution C were mixed with the solution D to obtain an impregnating solution, the carrier from step 1) was immersed into the impregnating solution, stirred evenly for ultrasound concussion with ultrasonic cleaner for 10 minutes, evaporated and stirred with water bath under 70° C. for 10 minutes, dried in the oven under 105° C. for 12 hours and then calcined under 400° C. for 5 hours to obtain a catalyst for synergistic denitration and mercury oxidation with $V_2O_5$, $WO_3$, $Cr_2O_3$, $Nb_2O_5$ and CuO in the following mass percentage: carrier $TiO_2$ 85.9%, active component $V_2O_5$ 0.1%, active component $WO_3$ 1%, active component $Cr_2O_3$ 5%, active component $Nb_2O_5$ 5% and co-catalyst CuO 3%. The prepared catalyst was grounded and sieved to obtain catalyst particles with particle size of 40-60 mesh.

Test 3

0.2 g catalyst particle prepared in example 3 was put into a catalyst denitration activity evaluation unit and activity evaluation was conducted in a fixed bed reactor with inner diameter of 8 mm. $O_2/N_2$, $NO/N_2$, $NH_3/N_2$, $SO_2/N_2$ and $N_2$ were controlled and mixed via mass flowmeter, deionized water was injected into heating pipeline for vaporization by adjusting volume in a micro-injection pump to realize addition of vapor and obtain simulated flue gas in such composition as 5% $O_2$, 1000 ppmNO, 1000NH₃, 500 ppmSO₂ and 10% $H_2O$, with $N_2$ as balance gas, air speed of 300000 h⁻, reaction temperature of 350° C. and $NH_3/NO$ as 1. Gas composition was tested with ULTRMAT 32 gas analyzer manufactured by SIEMENS and the denitration efficiency was 79%.

0.2 g catalyst particle prepared in example 3 was put into a catalyst mercury removal activity evaluation unit and activity evaluation was conducted in a fixed bed reactor with inner diameter of 8 mm. $Hg^0/N_2$, $O_2/N_2$, $HCl\backslash N_2$, $NO/N_2$, $NH_3/N_2$, $SO_2/N_2$ and $N_2$ were controlled and mixed via mass flowmeter, deionized water was injected into heating pipeline for vaporization by adjusting volume in a micro-injection pump to realize addition of vapor and obtain simulated flue gas in such composition as 100 μg/m³Hg⁰, 5% $O_2$, 10 ppmHCl, 300 ppmNO, 50 ppmNH₃, 500 ppmSO₂ and 10% $H_2O$, with $N_2$ as balance gas, air speed of 300000 $h^{-1}$ and reaction temperature of 350° C. Mercury concentration was tested with EMP-2 portable mercury analyzer manufactured by NIC and the oxygenation rate of zero-valent mercury was 73%.

EXAMPLE 4

1) $TiO_2$ (nanoscale anatase $TiO_2$, commercially available, particle size less than 30 nm) was tried under 110° C. for 18 hours and used as a carrier;

2) Ammonium metavanadate and ammonium metatungstate were stirred under 60° C. to dissolve in oxalic acid solution to obtain a solution A with pH value less than 2;

Chromic nitrate was stirred under 30° C. to dissolve in deionized water to obtain a solution B;

Niobium oxalate was stirred under 60° C. to dissolve in deionized water to obtain a solution C;

3) Ferric nitrate was stirred under 10° C. to dissolve in deionized water to obtain a solution E;

4) The solution A, solution B and solution C were mixed with the solution E to obtain an impregnating solution, the carrier from step 1) was immersed into the impregnating solution, stirred evenly for ultrasound concussion with ultrasonic cleaner for 30 minutes, evaporated and stirred with water bath under 80° C. for 30 minutes, dried in the oven under 110° C. for 18 hours and then calcined under 475° C. for 4 hours to obtain a catalyst for synergistic denitration and mercury oxidation with $V_2O_5$, $WO_3$, $Cr_2O_3$, $Nb_2O_5$ and $Fe_2O_3$ in the following mass percentage:

carrier $TiO_2$ 92.2%, active component $V_2O_5$ 2.5%, active component $WO_3$ 5%, active component $Cr_2O_3$ 0.1%, active component $Nb_2O_5$ 0.1% and co-catalyst $Fe_2O_3$ 0.1%. The prepared catalyst was grounded and sieved to obtain catalyst particles with particle size of 40-60 mesh.

Test 4

0.2 g catalyst particle prepared in example 4 was put into a catalyst denitration activity evaluation unit and activity evaluation was conducted in a fixed bed reactor with inner diameter of 8 mm. $O_2/N_2$, $NO/N_2$, $NH_3/N_2$, $SO_2/N_2$ and $N_2$ were controlled and mixed via mass flowmeter, deionized water was injected into heating pipeline for vaporization by adjusting volume in a micro-injection pump to realize addition of vapor and obtain simulated flue gas in such composition as 5% $O_2$, 1000 ppmNO, 1000 NH₃, 500 ppmSO₂ and 10%$H_2O$, with $N_2$ as balance gas, air speed of 300000 h⁻, reaction temperature of 350° C. and $NH_3/NO$ as 1. Gas composition was tested with ULTRMAT 32 gas analyzer manufactured by SIEMENS and the denitration efficiency was 83%.

0.2 g catalyst particle prepared in example 4 was put into a catalyst mercury removal activity evaluation unit and activity evaluation was conducted in a fixed bed reactor with inner diameter of 8 mm. $Hg^0/N_2$, $O_2/N_2$, $HCl\backslash N_2$, $NO/N_2$, $NH_3/N_2$, $SO_2/N_2$ and $N_2$ was controlled and mixed via mass flowmeter, deionized water was injected into heating pipeline for vaporization by adjusting volume in a micro-injection pump to realize addition of vapor and obtain simulated flue gas in such composition as 100 μg/m³Hg⁰, 5% $O_2$, 10 ppmHCl, 300 ppmNO, 50 ppmNH₃, 500 ppmSO₂ and 10% $H_2O$, with $N_2$ as balance gas, air speed of 300000 $h^{-1}$ and reaction temperature of 350° C. Mercury concentration was tested with EMP-2 portable mercury analyzer manufactured by NIC and the oxygenation rate of zero-valent mercury was 79%.

EXAMPLE 5

1) $TiO_2$ (nanoscale anatase $TiO_2$, commercially available, particle size less than 30 nm) was dried under 110° C. for 18 hours and used as a carrier;

2) Ammonium metavanadate and ammonium metatungstate were stirred under 60° C. to dissolve in tartaric acid solution to obtain a solution A with pH value less than 2;

Chromic nitrate was stirred under 30° C. to dissolve in deionized water to obtain a solution B;

Niobium oxalate was stirred under 60° C. to dissolve in deionized water to obtain a solution C;

3) Ferric nitrate was stirred under 30° C. to dissolve in tartaric acid to obtain a solution E;

4) The solution A, solution B and solution C were mixed with the solution E to obtain an impregnating solution, the carrier from step 1) was immersed into the impregnating solution, stirred evenly for ultrasound concussion with an ultrasonic cleaner for 30 minutes, evaporated and stirred with water bath under 80° C. for 30 minutes, dried in the oven under 110° C. for 18 hours and then calcined under 475° C. for 4 hours to obtain a catalyst for synergistic denitration and mercury oxidation with $V_2O_5$, $WO_3$, $Cr_2O_3$, $Nb_2O_5$ and $Fe_2O_3$ in the following mass percentage: carrier $TiO_2$ 86%, active component $V_2O_5$ 2.5%, active component $WO_3$ 5%, active component $Cr_2O_3$ 2.5%, active component $Nb_2O_5$ 2.5% and co-catalyst $Fe_2O_3$ 1.5%. The prepared catalyst was grounded and sieved to obtain catalyst particles with particle size of 40-60 mesh.

Test 5

0.2 g catalyst particle prepared in example 5 was put into a catalyst denitration activity evaluation unit and activity evaluation was conducted in a fixed bed reactor with an inner diameter of 8 mm. $O_2/N_2$, $NO/N_2$, $NH_3/N_2$, $SO_2/N_2$ and $N_2$ were controlled and mixed via mass flowmeter, deionized water was injected into heating pipeline for vaporization by adjusting volume in a micro-injection pump to realize addition of vapor and obtain simulated flue gas in such composition as 5% $O_2$, 1000 ppmNO, 1000$NH_3$, 500 ppm$SO_2$ and 10% $H_2O$, with $N_2$ as balance gas, air speed of 300000 $h^{-1}$, reaction temperature of 350° C. and $NH_3/NO$ as 1. Gas composition was tested with ULTRMAT 32 gas analyzer manufactured by SIEMENS and the denitration efficiency was 86%.

0.2 g catalyst particle prepared in example 5 was put into a catalyst mercury removal activity evaluation unit and activity evaluation was conducted in a fixed bed reactor with an inner diameter of 8 mm. $Hg^0/N_2$, $O_2/N_2$, $HCl\backslash N_2$, $NO/N_2$, $NH_3/N_2$, $SO_2/N_2$ and $N_2$ were controlled and mixed via mass flowmeter, deionized water was injected into heating pipeline for vaporization by adjusting volume in a micro-injection pump to realize addition of vapor and obtain simulated flue gas in such composition as 100 μg/m³$Hg^0$, 5% $O_2$, 10 ppmHCl, 300 ppmNO, 50 ppm$NH_3$, 500 ppm$SO_2$ and 10% $H_2O$, with $N_2$ as balance gas, air speed of 300000 $h^{-1}$ and reaction temperature of 350° C. Mercury concentration was tested with EMP-2 portable mercury analyzer manufactured by NIC and the oxygenation rate of zero-valent mercury was 84%.

EXAMPLE 6

1) $TiO_2$ (nanoscale anatase $TiO_2$, commercially available, particle size less than 30 nm) was dried under 110° C. for 18 hours and used as a carrier;

2) Ammonium metavanadate and ammonium metatungstate were stirred under 60° C. to dissolve in oxalic acid solution to obtain a solution A with pH value less than 2;

Chromic nitrate was stirred under 30° C. to dissolve in deionized water to obtain a solution B;

Niobium oxalate was stirred under 60° C. to dissolve in deionized water to obtain a solution C;

3) Ferric nitrate was stirred under 50° C. to dissolve in deionized water to obtain a solution E;

4) The solution A, solution B and solution C were mixed with the solution E to obtain an impregnating solution, the carrier from step 1) was immersed into the impregnating solution, stirred evenly for ultrasound concussion with ultrasonic cleaner for 30 minutes, evaporated and stirred with water bath under 80° C. for 30 minutes, dried in the oven under 110° C. for 18 hours and then calcined under 475° C. for 4 hours to obtain a catalyst for synergistic denitration and mercury oxidation with $V_2O_5$, $WO_3$, $Cr_2O_3$, $Nb_2O_5$ and $Fe_2O_3$ in the following mass percentage: carrier $TiO_2$ 79.5%, active component $V_2O_5$ 2.5%, active component $WO_3$ 5%, active component $Cr_2O_3$ 5%, active component $Nb_2O_5$ 5% and co-catalyst $Fe_2O_3$ 3%. The prepared catalyst was grounded and sieved to obtain catalyst particles with particle size of 40-60 mesh.

Test 6

0.2 g catalyst particle prepared in example 6 was put into a catalyst denitration activity evaluation unit and activity evaluation was conducted in a fixed bed reactor with inner diameter of 8 mm. $O_2/N_2$, $NO/N_2$, $NH_3/N_2$, $SO_2/N_2$ and $N_2$ were controlled and mixed via mass flowmeter, deionized water was injected into heating pipeline for vaporization by adjusting volume in a micro-injection pump to realize addition of vapor and obtain simulated flue gas in such composition as 5% $O_2$, 1000 ppmNO, 1000 $NH_3$, 500 ppm$SO_2$ and 10% $H_2O$, with $N_2$ as balance gas, air speed of 300000 $h^-$, reaction temperature of 350° C. and $NH_3/NO$ as 1. Gas composition was tested with ULTRMAT 32 gas analyzer manufactured by SIEMENS and the denitration efficiency was 88%.

0.2 g catalyst particle prepared in example 6 was put into a catalyst mercury removal activity evaluation unit and activity evaluation was conducted in a fixed bed reactor with inner diameter of 8 mm. $Hg^0/N_2$, $O_2/N_2$, $HCl\backslash N_2$, $NO/N_2$, $NH_3/N_2$, $SO_2/N_2$ and $N_2$ were controlled and mixed via mass flowmeter, deionized water was injected into a heating pipeline for vaporization by adjusting volume in a micro-injection pump to realize addition of vapor and obtain simulated flue gas in such composition as 100 μg/m³$Hg^0$, 5% $O_2$, 10 ppmHCl, 300 ppmNO, 50 ppm$NH_3$, 500 ppm$SO_2$ and 10% $H_2O$, with $N_2$ as balance gas, air speed of 300000 $h^{-1}$ and reaction temperature of 350° C. Mercury concentration was tested with EMP-2 portable mercury analyzer manufactured by NIC and the oxygenation rate of zero-valent mercury was 87%.

EXAMPLE 7

1) $TiO_2$ (nanoscale anatase $TiO_2$, commercially available, particle size less than 30 nm) was dried under 120° C. for 24 hours and used as a carrier;

2) Ammonium metavanadate and ammonium metatungstate were stirred under 70° C. to dissolve in oxalic acid solution to obtain a solution A with pH value less than 2;

Chromic nitrate was stirred under 50° C. to dissolve in deionized water to obtain a solution B;

Niobium oxalate was stirred under 70° C. to dissolve in deionized water to obtain a solution C;

3) Ammonium molybdate was stirred under 10° C. to dissolve in deionized water to obtain a solution F;

4) The solution A, solution B and solution C were mixed with the solution F to obtain an impregnating solution, the carrier from step 1) was immersed into the impregnating solution, stirred evenly for ultrasound concussion with ultrasonic cleaner for 60 minutes, evaporated and stirred with water bath under 90° C. for 60 minutes, dried in the oven under 120° C. for 24 hours and then calcined under 550° C. for 3 hours to obtain a catalyst for synergistic denitration and mercury oxidation with $V_2O_5$, $WO_3$, $Cr_2O_3$, $Nb_2O_5$ and $MoO_3$ in the following mass percentage: carrier $TiO_2$ 84.7%, active component $V_2O_5$ 5%, active component $WO_3$ 10%, active component $Cr_2O_3$ 0.1%, active component $Nb_2O_5$ 0.1% and co-catalyst $MoO_3$ 0.1%. The prepared catalyst was grounded and sieved to obtain catalyst particles with particle size of 40-60 mesh.

Test 7

0.2 g catalyst particle prepared in example 7 was put into a catalyst denitration activity evaluation unit and activity evaluation was conducted in a fixed bed reactor with inner diameter of 8 mm. $O_2/N_2$, $NO/N_2$, $NH_3/N_2$, $SO_2/N_2$ and $N_2$ via mass flowmeter were controlled and mixed, deionized water was injected into heating pipeline for vaporization by adjusting volume in a micro-injection pump to realize addition of vapor and obtain simulated flue gas in such composition as 5% $O_2$, 1000 ppmNO, 1000$NH_3$, 500 ppm$SO_2$ and 10% $H_2O$, with $N_2$ as balance gas, air speed of 300000 $h^-$, reaction temperature of 350° C. and $NH_3/NO$ as 1. Gas composition was tested with ULTRMAT 32 gas analyzer manufactured by SIEMENS and the denitration efficiency was 90%.

0.2 g catalyst particle prepared in example 7 was into a catalyst mercury removal activity evaluation unit and activity evaluation was conducted in a fixed bed reactor with inner diameter of 8 mm. $Hg^0/N_2$, $O_2/N_2$, $HCl\backslash N_2$, $NO/N_2$, $NH_3/N_2$, $SO_2/N_2$ and $N_2$ were controlled and mixed via mass flowmeter, deionized water was injected into heating pipeline for vaporization by adjusting volume in a micro-injection pump to realize addition of vapor and obtain simulated flue gas in such composition as 100 $\mu g/m^3 Hg^0$, 5% $O_2$, 10 ppmHCl, 300 ppmNO, 50 ppm$NH_3$, 500 ppm$SO_2$ and 10% $H_2O$, with $N_2$ as balance gas, air speed of 300000 $h^{-1}$ and reaction temperature of 350° C.

Mercury concentration was tested with EMP-2 portable mercury analyzer manufactured by NIC and the oxygenation rate of zero-valent mercury was 89%.

EXAMPLE 8

1) $TiO_2$ (nanoscale anatase $TiO_2$, commercially available, particle size less than 30 nm) was dried under 120° C. for 24 hours and used as a carrier;

2) Ammonium metavanadate and ammonium metatungstate were stirred under 70° C. to dissolve in tartaric acid solution to obtain a solution A with pH value less than 2;

Chromic nitrate was stirred under 50° C. to dissolve in deionized water to obtain a solution B;

Niobium oxalate was stirred under 70° C. to dissolve in deionized water to obtain a solution C;

3) Ammonium molybdate was stirred under 30° C. to dissolve in tartaric acid to obtain a solution F;

4) The solution A, solution B and solution C with the solution F were mixed to obtain an impregnating solution, the carrier from step 1) was immersed into the impregnating solution, stirred evenly for ultrasound concussion with ultrasonic cleaner for 60 minutes, evaporated and stirred with water bath under 90° C. for 60 minutes, dried in the oven under 120° C. for 24 hours and then calcined under 550° C. for 3 hours to obtain a catalyst for synergistic denitration and mercury oxidation with $V_2O_5$, $WO_3$, $Cr_2O_3$, $Nb_2O_5$ and $MoO_3$ in the following mass percentage: carrier $TiO_2$ 78.5%, active component $V_2O_5$ 5%, active component $WO_3$ 10%, active component $Cr_2O_3$ 2.5%, active component $Nb_2O_5$ 2.5% and co-catalyst $MoO_3$ 1.5%. The prepared catalyst was grounded and sieved to obtain catalyst particles with particle size of 40-60 mesh.

Test 8

0.2 g catalyst particle prepared in example 8 was put into a catalyst denitration activity evaluation unit and activity evaluation was conducted in a fixed bed reactor with an inner diameter of 8 mm. $O_2/N_2$, $NO/N_2$, $NH_3/N_2$, $SO_2/N_2$ and $N_2$ were controlled and mixed via mass flowmeter, deionized water was injected into heating pipeline for vaporization by adjusting volume in a micro-injection pump to realize addition of vapor and obtain simulated flue gas in such composition as 5% $O_2$, 1000 ppmNO, 1000$NH_3$, 500 ppm$SO_2$ and 10% $H_2O$, with $N_2$ as balance gas, air speed of 300000 $h^-$, reaction temperature of 350° C. and $NH_3/NO$ as 1. Gas composition was tested with ULTRMAT 32 gas analyzer manufactured by SIEMENS and the denitration efficiency was 94%.

0.2 g catalyst particle prepared in example 8 was put into a catalyst mercury removal activity evaluation unit and activity evaluation was conducted in a fixed bed reactor with inner diameter of 8 mm. $Hg^0/N_2$, $O_2/N_2$, $HCl\backslash N_2$, $NO/N_2$, $NH_3/N_2$, $SO_2/N_2$ and $N_2$ via mass flowmeter were controlled and mixed, deionized water was injected into a heating pipeline for vaporization by adjusting volume in a micro-injection pump to realize addition of vapor and obtain simulated flue gas in such composition as 100 $\mu g/m^3 Hg^0$, 5% $O_2$, 10 ppmHCl, 300 ppmNO, 50 ppm$NH_3$, 500 ppm$SO_2$ and 10% $H_2O$, with $N_2$ as balance gas, air speed of 300000 $h^{-1}$ and reaction temperature of 350° C. Mercury concentration was tested with EMP-2 portable mercury analyzer manufactured by NIC and the oxygenation rate of zero-valent mercury was 91%.

EXAMPLE 9

1) $TiO_2$ (nanoscale anatase $TiO_2$, commercially available, particle size less than 30 nm) was dried under 120° C. for 24 hours and used as a carrier;

2) Ammonium metavanadate and ammonium metatungstate were dried under 70° C. to dissolve in oxalic acid solution to obtain a solution A with pH value less than 2;

Chromic nitrate was stirred under 50° C. to dissolve in deionized water to obtain a solution B;

Niobium oxalate was stirred under 70° C. to dissolve in deionized water to obtain a solution C;

3) Ammonium molybdate was stirred under 50° C. to dissolve in deionized water to obtain a solution F;

4) The solution A, solution B and solution C were mixed with the solution F to obtain an impregnating solution, the carrier from step 1) was immersed into the impregnating solution, stirred evenly for ultrasound concussion with ultrasonic cleaner for 60 minutes, evaporated and stirred with water bath under 90° C. for 60 minutes, dried in the oven under 120° C. for 24 hours and then calcined under 550° C. for 3 hours to obtain a catalyst for synergistic denitration and mercury oxidation with $V_2O_5$, $WO_3$, $Cr_2O_3$, $Nb_2O_5$ and $MoO_3$ in the following mass percentage: carrier $TiO_2$ 72%, active component $V_2O_5$ 5%, active component $WO_3$ 10%, active component $Cr_2O_3$ 5%, active component $Nb_2O_5$ 5% and co-catalyst $MoO_3$ 3%. The prepared catalyst was grounded and sieved to obtain catalyst particles with particle size of 40-60 mesh.

Test 9

0.2 g catalyst particle prepared in example 9 was put into a catalyst denitration activity evaluation unit and activity evaluation was conducted in a fixed bed reactor with inner diameter of 8 mm. $O_2/N_2$, $NO/N_2$, $NH_3/N_2$, $SO_2/N_2$ and $N_2$ via mass flowmeter were controlled and mixed, deionized water was injected into heating pipeline for vaporization by adjusting volume in a micro-injection pump to realize addition of vapor and obtain simulated flue gas in such composition as 5% $O_2$, 1000 ppmNO, 1000$NH_3$, 500 ppm$SO_2$ and 10% $H_2O$, with $N_2$ as balance gas, air speed of 300000 h$^-$, reaction temperature of 350° C. and $NH_3$/NO as 1. Gas composition was tested with ULTRMAT 32 gas analyzer manufactured by SIEMENS and the denitration efficiency was 96%.

0.2 g catalyst particle prepared in example 9 was put into a catalyst mercury removal activity evaluation unit and activity evaluation was conducted in a fixed bed reactor with an inner diameter of 8 mm. $Hg^0/N_2$, $O_2/N_2$, $HCl\backslash N_2$, $NO/N_2$, $NH_3/N_2$, $SO_2/N_2$ and $N_2$ were controlled and mixed via mass flowmeter, deionized water was injected into heating pipeline for vaporization by adjusting volume in a micro-injection pump to realize addition of vapor and obtain simulated flue gas in such composition as 100 μg/m$^3$Hg$^0$, 5% $O_2$, 10 ppmHCl, 300 ppmNO, 50 ppm$NH_3$, 500 ppm$SO_2$ and 10% $H_2O$, with $N_2$ as balance gas, air speed of 300000 h$^{-1}$ and reaction temperature of 350° C. Mercury concentration was tested with EMP-2 portable mercury analyzer manufactured by NIC and the oxygenation rate of zero-valent mercury was 95%.

The aforesaid example is just a better scheme for the present invention, instead of any form of limitation, and other variants and versions are allowed on the premise of not exceeding the technical solution recorded in the claims.

The invention claimed is:

1. A method for preparing a catalyst for synergistic control of oxynitride and mercury, wherein the method comprises the following steps:

1) drying $TiO_2$ and use $TiO_2$ as a carrier;
2) stirring ammonium metavanadate and ammonium metatungstate under 50° C.-70° C. to dissolve in an oxalic acid or tartaric acid solution to obtain a solution A with pH value less than 2;

stirring chromic nitrate under 10-50° C. to dissolve in deionized water or tartaric acid to obtain a solution B;

stirring niobium oxalate under 50-70° C. to dissolve in deionized water or tartaric acid to obtain a solution C;
3) stirring cupric nitrate under 10-50° C. to dissolve in deionized water or tartaric acid to obtain a solution D;

or stirring ferric nitrate under 10-50° C. to dissolve in deionized water or tartaric acid to obtain a solution E;

or stirring ammonium molybdate under 10-50° C. to dissolve in deionized water or tartaric acid to obtain a solution F;
4) mixing the solution A, solution B and solution C with one of the solution D, solution E and solution F to obtain an impregnating solution, immersing the carrier from step 1) into the impregnating solution, stirring evenly for ultrasound concussion, evaporating and stirring with water bath for 10-60 minutes, drying in the oven and then calcine under 400° C.-550° C. for 3-5 hours to obtain the catalyst for synergistic control of oxynitride and mercury.

2. The preparation method according to claim 1, wherein the drying in step 1) is drying under 105° C.-120° C. for 12 hours-24 hours.

3. The preparation method according to claim 1, wherein the ultrasound concussion time in step 4) is 10-60 minutes.

4. The preparation method according to claim 1, wherein the water bath temperature in step 4) is 70-90° C.

5. The preparation method according to claim 4, wherein the drying condition in oven in step 4) is drying under 105-120° C. for 12-24 hours.

* * * * *